US012620043B1

(12) United States Patent
Smith et al.

(10) Patent No.: US 12,620,043 B1
(45) Date of Patent: May 5, 2026

(54) COMPUTER-BASED SYSTEM TO DETERMINE A DISTRIBUTION OF TIMES A VEHICLE SPENDS AT DIFFERENT LOCATIONS ON A ROUTE

(71) Applicant: Applied Underwriters, Inc., Omaha, NE (US)

(72) Inventors: Justin N. Smith, Woodside, CA (US); Sean Hughes, Niskayuna, NY (US); James Shasta Daulton, Concord, CA (US)

(73) Assignee: Applied Underwriters, Inc., Omaha, NE (US)

( * ) Notice: Subject to any disclaimer, the term of this patent is extended or adjusted under 35 U.S.C. 154(b) by 0 days.

(21) Appl. No.: 16/578,445

(22) Filed: Sep. 23, 2019

Related U.S. Application Data

(60) Division of application No. 14/578,535, filed on Dec. 22, 2014, now abandoned, which is a continuation-in-part of application No. 14/188,944, filed on Feb. 25, 2014, now Pat. No. 9,286,640.

(60) Provisional application No. 62/058,181, filed on Oct. 1, 2014, provisional application No. 61/772,635, filed on Mar. 5, 2013.

(51) Int. Cl.
G06Q 50/26 (2024.01)
G06Q 10/00 (2023.01)

(52) U.S. Cl.
CPC ........... G06Q 50/265 (2013.01); G06Q 10/00 (2013.01)

(58) Field of Classification Search
CPC ............................. G06Q 50/265; G06Q 10/00
See application file for complete search history.

(56) References Cited

U.S. PATENT DOCUMENTS

| | | | |
|---|---|---|---|
| 6,301,563 B1 | 10/2001 | Brown et al. | |
| 8,095,480 B2 * | 1/2012 | Kristal | ..................... G09B 7/06 |
| | | | 706/12 |
| 8,255,262 B2 | 8/2012 | Siegel et al. | |
| 8,296,059 B2 | 10/2012 | Urciuoli et al. | |
| 8,548,934 B2 | 10/2013 | Lay et al. | |

(Continued)

OTHER PUBLICATIONS

*SiRF Technology, Inc., E-Ten Corp., Pharos Science & Applications, Inc., MiTAC International Corp., and Mio Technology Limited, USA, v. International Trade Commission,* 601F.3d 1319(2010), No. 2009-1262, Apr. 12, 2010., https://scholar.google.com/scholar_case?case=11218305250522225626, last viewed May 5, 2016.

(Continued)

*Primary Examiner* — Michael Jared Walker
(74) *Attorney, Agent, or Firm* — Marin Patents, LLC; Gustavo Marin

(57) ABSTRACT

A computer-based system to determine a distribution of times a vehicle spends at different locations on a route has a global positioning system, a microprocessor, an output device and computer instructions. The instructions cause the system to read in from the GPS a monitored location of the vehicle and an associated time. The system then calculates a corrected location of the vehicle based on the closest point of the route to the monitored location. The system then computes the distribution of the times the vehicle spends at different locations on said route based at least in part on the corrected location and associated time. The system then outputs the distribution on a computer screen.

5 Claims, 4 Drawing Sheets

(56)                 References Cited

U.S. PATENT DOCUMENTS

| 8,583,470 | B1 | 11/2013 | Fine et al. | |
| 8,761,795 | B2 * | 6/2014 | Stargardt | H04W 4/021 |
| | | | | 455/456.1 |
| 8,793,151 | B2 | 7/2014 | DelZoppo et al. | |
| 8,838,515 | B2 | 9/2014 | Hansen et al. | |
| 8,959,030 | B2 | 2/2015 | Ricci | |
| 8,977,563 | B2 | 3/2015 | Burns | |
| 9,015,079 | B2 | 4/2015 | Clifford et al. | |
| 9,020,848 | B1 | 4/2015 | Ridge et al. | |
| 9,070,162 | B2 * | 6/2015 | Cherry | G06Q 40/00 |
| 9,213,953 | B1 * | 12/2015 | Kassmann | G06Q 10/0631 |
| 9,250,085 | B2 | 2/2016 | Hwang et al. | |
| 9,255,808 | B2 | 2/2016 | Andersson et al. | |
| 9,324,068 | B2 * | 4/2016 | Soundararajan | H04W 4/80 |
| 2007/0198450 | A1 * | 8/2007 | Khalsa | G06Q 10/06 |
| | | | | 706/47 |
| 2008/0047016 | A1 * | 2/2008 | Spoonamore | G06Q 10/06 |
| | | | | 726/25 |
| 2009/0248375 | A1 | 10/2009 | Billiotte et al. | |
| 2010/0161462 | A1 | 6/2010 | Pappas et al. | |
| 2011/0106743 | A1 | 5/2011 | Duchon | |
| 2011/0153536 | A1 | 6/2011 | Yang et al. | |
| 2011/0161119 | A1 | 6/2011 | Collins | |
| 2011/0282697 | A1 | 11/2011 | Fitzgerald et al. | |
| 2012/0022897 | A1 * | 1/2012 | Shafer | G06Q 40/08 |
| | | | | 705/4 |
| 2012/0060112 | A1 | 3/2012 | Wilson et al. | |
| 2012/0123806 | A1 | 5/2012 | Schumann, Jr. et al. | |
| 2012/0260210 | A1 | 10/2012 | Siegel et al. | |
| 2012/0271651 | A1 | 10/2012 | Gilbert et al. | |
| 2013/0006718 | A1 | 1/2013 | Nielsen et al. | |
| 2013/0024334 | A1 | 1/2013 | Kozlay | |
| 2013/0030844 | A1 | 1/2013 | Pendergrass et al. | |
| 2013/0031041 | A1 | 1/2013 | Maciejewski et al. | |
| 2013/0080362 | A1 | 3/2013 | Chang et al. | |
| 2013/0085796 | A1 | 4/2013 | Ruffolo | |
| 2013/0197963 | A1 | 8/2013 | Deb et al. | |
| 2013/0297551 | A1 | 11/2013 | Smith et al. | |
| 2014/0095425 | A1 * | 4/2014 | Sipple | G06N 5/02 |
| | | | | 706/52 |
| 2014/0180723 | A1 * | 6/2014 | Cote | G06Q 40/08 |
| | | | | 705/4 |
| 2014/0244559 | A1 * | 8/2014 | Zemore | G06Q 10/0635 |
| | | | | 706/46 |
| 2018/0170349 | A1 * | 6/2018 | Jobson | B60L 7/18 |

OTHER PUBLICATIONS

Azfamily.com; List of those killed on Sep. 2011; Oct. 7, 2014.
Twitter.com/bobby_stanton; Anti-terror Metro program monitors bus passengers; May 9, 2014.
Risk Management Solutions, Inc. by Maria Paul; Workers Compensation Catastrophes dated Jun. 7, 2011.
Wikipedia; Casulaties of the Sep. 11 attacks; Oct. 7, 2014.
Jon Coaffee; Knowledge, Technology, & Policy, Summer 2003, vol. 16 No. 2. pp. 63-83; Morphing the Counter-Terrorist Response: Beating the Bombers in London's Financial Heart.
Tom Daley; National Council on Compensation Insurance, Inc.; Casualty Acturial Society Forum, Winter 2007; Catastrophes and Workers Compensation Ratemaking.
Sheena Harrison; Business Insurance; Employees' vulnerability to terrorism affecting workers comp rates in major cities; May 9, 2014.
Wikipedia; Error analysis for the Global Positioning System; Oct. 7, 2014.
Claire French and Margaret O'Mahony; Measuring Risk of Attack on Bus Network dated Nov. 15, 2007.
Wikipedia; Geographic information system; Oct. 7, 2014.
Wikipedia; GPS enhancement; Oct. 7, 2014.

Nurit Kliot and Igal Charney; GeoJournal (2006); Springer Science+ Business Media B.V. 2006; Published online: Nov. 9, 2006; The geography of suicide terrorism in Israel.
Marsh & McLennan Companies; President's Working Group on Financial Markets: The Long-Term Availability and Affordability of Insurance for Terrorism Risk Response from Marsh & McLennan Companies, Inc. dated Sep. 16, 2013.
World News; Rush-hour blast kills 14 on trolley bus in Volgograd, Russia; 3rd deadly attack in four days; May 9, 2014.
Harry Shuford and Jonathan Evans; Casualty Acturial Society Discussion Paper Program, 2005; Modeling the Solvency Impact of TRIA on the Workers Compensation Insurance Industry.
RMS; White Paper; Quantifying U.S. Terrorism Risk; US terrorism risk modeling to assess the costs and benefits of a TRIA renewal, Dec. 3, 2013.
Annalee Newitz; Io9.com; The hidden bus routes in San Francisco that are only for techno-elites; May 9, 2014.
Mathworks.com; Vector and matrix norms; Oct. 15, 2014.
ADP; ADP Mobile Solutions—Support Page; http://www.adp.com/mobilesolutions/support.aspx; Jan. 27, 2014.
ADP; ADP Mobile Solutions, Mobile Product Employee, Mobile HR Services; http://www.adp.com/mobilesolutions/employee/; Jan. 27, 2014.
Wikipedia, Defense Contract Audit Agency; https://en.wikipedia.org/wiki/Defense_Contract_Audit_Agency; Jan. 29, 2014.
Epaysystems.com; Employee Self Service Features; http://www.epaysystems.co m/emplo yee-self-service/; Feb. 19, 2014.
CertusView; e-Sketch, Certus View; http://certusview.com/e-sketch-application/; Feb. 19, 2014.
ExakTime Mobile; ExakTime Mobile Mobile Time Clock; Jan. 27, 2014.
Flowfinity; Security Guard Management; Jan. 29, 2014.
True Wireless, Inc.; 4 Mobile Time Clock Apps for Business; Jan. 27, 2014.
Android.gadgettouch.com; GPS Punch!—Tracking Ugly, Lazy Employees With This Free Application; http://android.gadgettouch.com/GPS-Punch-Tracking-ugly-lazy-employees-with-this-free-application; Jan. 28, 2014.
Kronos Incorporated; Workforce Ready Time & Attendance; Jan. 28, 2014.
Kronos Incorporated; Atlanta Public Schools Interfaces Kronos Timekeeping to Improve Position Control and Workforce Management; Jan. 28, 2014.
Software Advice, Inc.; Case Study: Kronos Helps Sulco Warehousing & Logistics and Lancer Transportation Manage Employee Time and Attendance; http://new-talent-times.softwareadvice.com/case-study-kronos-0713/; Jan. 28, 2014.
The Sleeter Group; Manage Payroll from your iPhone or iPad with Intuit Online Payroll Mobile; Jan. 27, 2014.
VDCRESEARCH; Mobile & Wireless Practice; Mobile HR Solutions: Connecting & Empowering Your Workforce; Jan. 31, 2014.
American Optometric Association; ARBO releases new OE Tracker mobile app for smartphones; Jan. 28, 2014.
Pacific Timesheet; Contruction Timesheets Track everyone in one place!;Jan. 29, 2014.
Pacific Timesheet; DCAA Compliance and Sarbanes-Oxley; Jan. 29, 2014.
Freedom Telecare, LLC; Frequently Asked Questions; Jan. 29, 2014.
TSheets Time Tracker; TSheets We Love Employees; Jan. 29, 2014.
Oregon Health & Science University; TTE User Guide; Telephone Time Entry (TTE); Mar. 8, 2013.
Employeetimeclocks.com; uAttend SmartPhone iPunch App SmartPhone Punch Clock; http://www.employeetimeclocks.com/prdct523-uattend-iphone-android-a; Feb. 19, 2014.
WKRCOMPLLC; Workers' Compensation iPhone APP Calculator; http://www.wkrcomp.com/app.php; Feb. 19, 2014.
Wikipedia, Poisson process, Nov. 21, 2014.

* cited by examiner

COMPUTER-BASED SYSTEM TO DETERMINE A DISTRIBUTION OF TIMES A VEHICLE SPENDS AT DIFFERENT LOCATIONS ON A ROUTE

COPYRIGHT AND TRADEMARK NOTICE

FIELD OF THE INVENTION

Embodiments of the present invention relate to artificial intelligence means for forecasting terror risk.

BACKGROUND OF THE INVENTION

Terrorist risks are difficult to predict. There is very little data available on actual attacks. Thus, most of the work in this area has involved the creation of so-called "Delphic" models, which are produced by creating a group of acknowledged experts on terrorism and having them produce a "catalog" of likely attacks, including details as to method, location, intensity, and timing. Several such inventories have been produced by specialist catastrophe risk modeling firms and are in use. Most of the details are not in the public domain, but certain included locations and events are known, as is the overall size of a typical catalog, which includes about 250,000 possible events. Employers have used these catalogs to estimate the level of terror an employee faces by looking at the terror risk of said employee's address of employment. Unfortunately, this method does not take into account the risks employees face when they work away from their formal address of employment. Thus there is a need for a computer-based prediction system for forecasting the level of risk an employee faces that takes into account the location distribution of said employee in the course of said employee's work.

SUMMARY OF THE INVENTION

The summary of the invention is provided as a guide to understanding the invention. It does not necessarily describe the most generic embodiment of the invention or the broadest range of alternative embodiments.

FIG. 1 illustrates a computer-based prediction system 100 for forecasting the level of risk an employee faces from a terrorist event that takes into account said employee's location distribution. As used herein, a "computer-based system" comprises an input device for receiving data, an output device for outputting data in tangible form (e.g. printing or displaying on a computer screen), a permanent memory for storing data and computer code, and a microprocessor for executing computer code wherein said computer code resident in said permanent memory will physically cause said microprocessor to read-in data via said input device, process said data within said microprocessor to produce output data and output said output data via said output device. Within FIG. 1, boxes represent modules and bidirectional arrows indicate data transmission. A module represents at least a portion of a computer-based system capable of carrying out a particular task. Modules may represent physically separate systems or unitary systems. Multiple modules may be executed by the same system.

The prediction system comprises an employee risk module 110. Said employee risk module reads employee location distribution data 102 from an employee location database 104. An employee location distribution is a set of data describing the physical location of an employee during the course of a work period. At a minimum, an employee location distribution comprises a first location and a first amount of time spent at said first location and a second location and a second amount of time spent at said second location.

The employee risk module also reads in terror risk distribution data 106 from a terror risk database 108. A terror risk distribution comprises data suitable for calculating a probability of terror attack of a given threshold of severity for one or more of said locations of said employee location distribution.

The employee risk module then calculates the level of risk an employee faces from a terrorist event according to the equation:

$$EmployeeRisk = \sum_{x,y,t} EmployeeLocation_{x,y,t} * TerrorRisk_{x,y,t}$$

where:
  a) EmployeeRisk is a level of risk an employee faces from a terrorist event;
  b) x, y indicates an employee location;
  c) t indicates a time which said employee is at said employee location;
  d) $EmployeeLocation_{x,y,t}$ is a distribution of said employee location expressed as a relative time spent by said employee at each location x, y at time t; and
  e) $TerrorRisk_{x,y,t}$ is the value of a distribution of terror risk at x, y, t expressed as a relative probability of a terror event at each of said employee locations x, y at time t.

Thus if an employee spent 80% of their time at a first location where the relative probability of a terror event was 1, and 20% of their time at a second location where the relative probability of a terror event was 10, then the EmployeeRisk for said employee would be 2.8.

The level of terror risk can then be output 114 to a user 116 via an output device so that said user can determine the relative level of terror risk an employee faces. EmployeeRisk can thus be used to assess the relative impact of changes made to an employee's location distribution and can also be used to compare the relative exposure of different employees with different location distributions. It can also be used to compare the overall levels of risk for different companies by summing the risks that all of each company's employees face.

DETAILED DESCRIPTION

The detailed description describes non-limiting exemplary embodiments. Any individual features may be combined with other features as required by different applications for at least the benefits described herein.

As used herein, the term "about" means plus or minus 10% of a given value unless specifically indicated otherwise.

Employee Location Distribution

Figure 1:
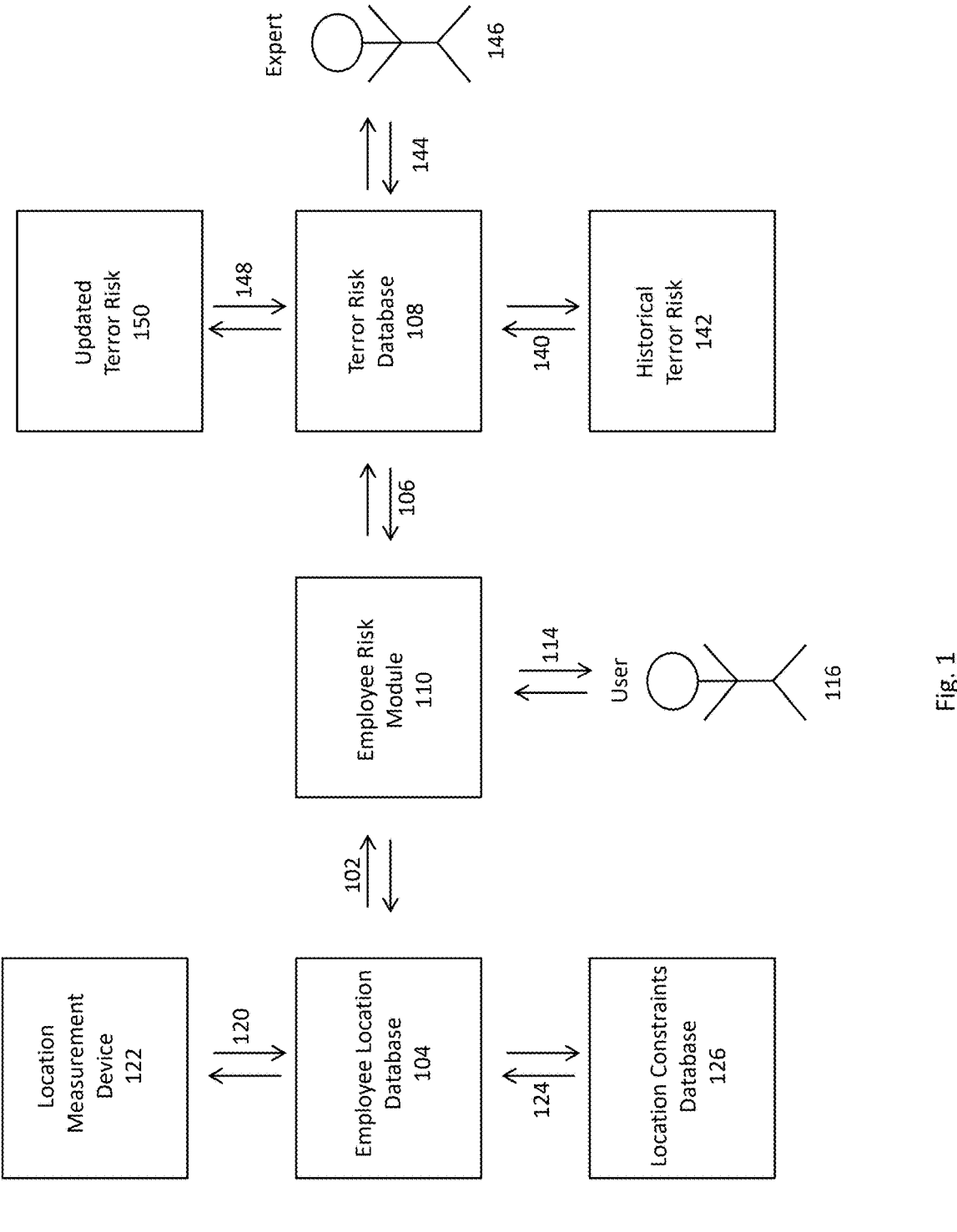
FIG. 1 illustrates a computer-based prediction system for forecasting the level of risk an employee faces from a terrorist event.

Referring to FIG. 1, the employee location database 104 may read in measured locations of an employee 120 to calculate an employee location distribution. An employee may be a conductor on a street car, for example. A global positioning system (GPS) may be mounted on said street car and act as a location measurement device 122 moving in conjunction with the employee. Data from said GPS sensor may be read into said employee location database on a periodic basis and used to calculate an employee location distribution. Other forms of location monitoring include GPS devices mounted on vehicles, such as cars, or carried with employees, such as smart phones. Other forms of location detection also include triangulation with cell phone towers, local area networks, WiFis, BlueTooth® transmitters or other broadcasting devices or protocols. Elevation information may be collected, for example, to determine what floor of a tall building an employee is located on.

Monitored location data of an employee may be subject to errors. When a GPS monitor is located near a tall building, for example, one or more of the corresponding GPS satellites may be partially or completely blocked. This can lead to relatively large errors in monitored position. These errors can be at least partially corrected for by reading in employee location constraints 124 from an employee location constraints database 126. In the above example, if an employee is a street car conductor, then the street car must be on its track. The track location can serve as a constraint on employee location. Thus if a monitored location is off of said track, then it can be at least partially corrected for by setting the location to the nearest track location.

A suitable expression for determining the closest track location to a given measured location is:

$$(\hat{x}, \hat{y}) = \text{Min}(\text{Norm}((x_m - x_r), (y_m - y_r)))$$

where:
  a) $(\hat{x}, \hat{y})$ is the closest location on a fixed route to a measured employee location;
  b) $(x_m, y_m)$ is said measured employee location;
  c) $(x_r, y_r)$ is a member of a set of locations on said fixed route;
  d) Norm( ) is the norm function for determining the distance between two points; and
  e) Min( ) is a minimization function that sets $(\hat{x}, \hat{y})$ equal to the value of $(x_r, y_r)$ that minimizes said norm function for a given $(x_m, y_m)$.

Thus computationally, the system microprocessor will examine a set of track locations for each measured employee location to determine the track location within the set that is closest to the measured location.

Location constraints can be relative. For example, if an employee is driving down a highway and passes a large building, the GPS data may indicate an apparent sudden large reversal in velocity due to an error in position. The monitored location can then be constrained to points that are within a certain range of velocities (both magnitude and direction) relative to a prior measured car velocity.

Terror Risk Distribution

The terror risk database 108 may be configured to read in opinions 144 from one or more experts 146 on the relative terror risk of different locations. The opinions may be expressed as a risk amplitude $A_i$ and a risk radius $R_i$ for a given location $(x_i, y_i)$. The terror risk database may convert the risk amplitudes and risk radii into a terror risk distribution based on the equation:

$$TerrorRisk_{x,y,t} = \sum_i \text{Distribution}_i(A_i, R_i, x_i, y_i)$$

where:
  a) i is an index of each location of terror risk;
  b) $x_i$, $y_i$ is the x, y location the $i^{th}$ terror risk;
  c) $A_i$ is a risk amplitude for the $i^{th}$ terror risk;
  d) $R_i$ is a risk radius for the $i^{th}$ terror risk; and
  e) Distribution ( ) is a functional form for the distribution of terror risk about a given location.

The functional form for the distribution of terror risk about a given location can be any suitable form, such as a normal distribution, fat tailed distribution (i.e. tails fatter than a normal distribution), linear distribution or constant distribution (i.e. risk level constant over Ri). Thus using the distribution function, the relative terror risks of each employee location in the employee location distribution can be calculated to determine an overall level of employee risk, even if the locations of terror risk do not correspond to the employee locations. A computationally simple distribution function is a linear distribution of the form:

$$\text{Distribution}_i(A_i, R_i, x_i, y_i, t_i) = \text{Max}\left(0, \left(A_i\left(1 - \frac{Norm((x - x_i), (y - y_i))}{R_i}\right)\right)\right)$$

where:
  Max( ) is the maximization function

Thus the level of terror risk about a given point $(x_i, y_i)$ will have a value of $A_i$ at $(x_i, y_i)$; decrease linearly up to a radius of Ri; and be zero at radii larger than Ri.

The terror risk database may also read in historical data related to terrorist events 140 from a historical terror database 142. Said historical terror database may comprise locations and times of different terrorist attacks. One or more terror risk distribution functions may be fit to said historical data.

The terror risk database may also read in updated risk information 148 from an updated terror risk database 150. Thus if new information becomes available about a new terror risk, the terror risk database can update the terror risk distribution.

Once the employee risk module 110 reads in the employee location distribution and terror risk distribution, both distributions can be integrated together to calculate a distribution and overall level of terror risk for an employee. The level of terror risk can then be output 114 to a user 116 via said output device so that said user can determine the relative level of terror risk an employee faces.

Example 1

Map Presentation of Risk

Figure 2:
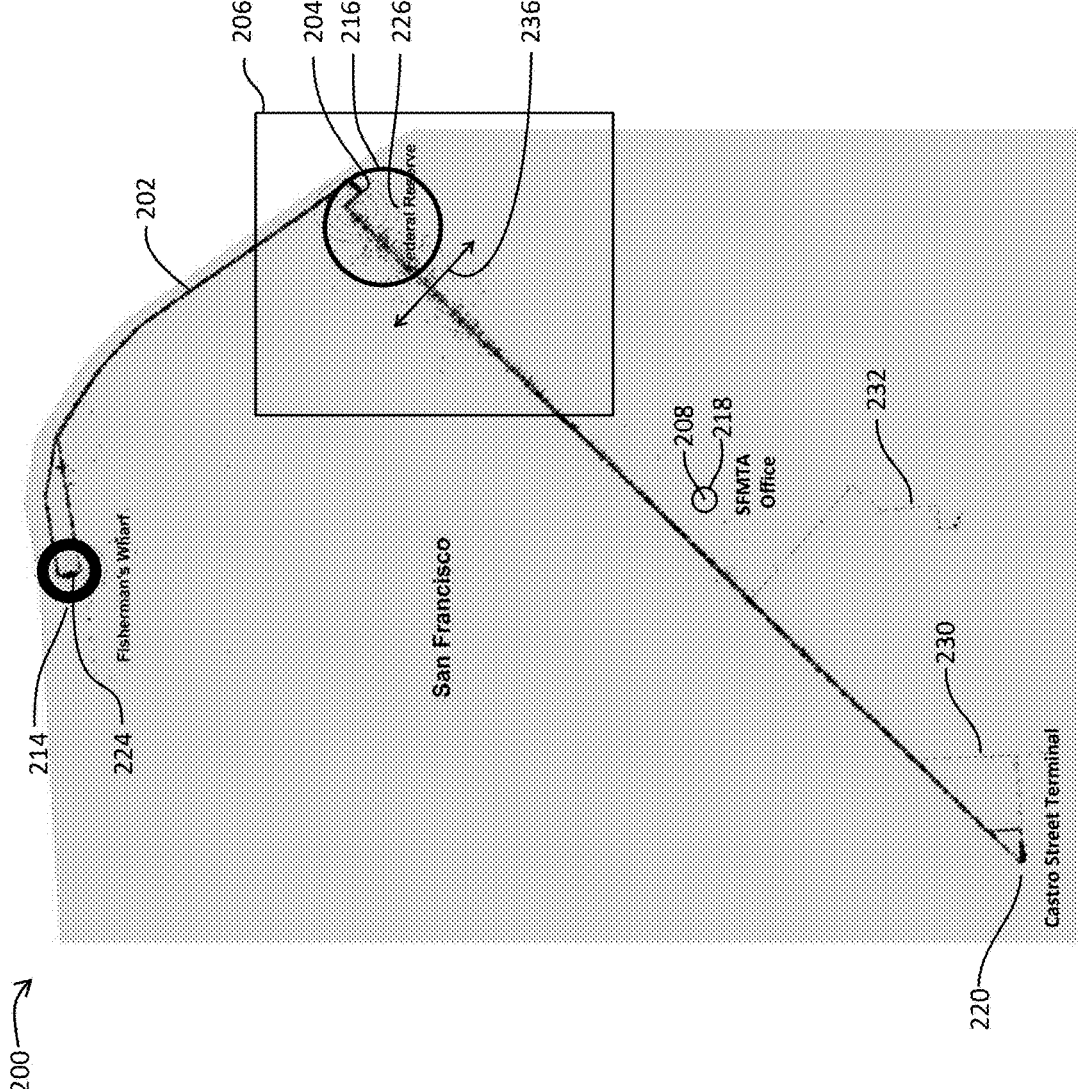
FIG. 2 is a graphical output illustrating monitored employee location distribution overlaid with a terror risk distribution.

FIG. 2 is a graphical output illustrating a monitored employee location distribution overlaid with a terror risk distribution. The area shown is a simplified map 200 of San Francisco, CA. The Castro Street Terminal 220, San Francisco Municipal Transportation Authority office (SFMTA) 208, Federal Reserve Building 226 and Fisherman's Wharf 224 are shown. These locations are served by the San Francisco F-car. The F-car is an electrically powered street car than runs a fixed route 202 on rails. The operator is an employee of the SFMTA and may have a work address at the SFMTA building. Three terrorist targets are indicated by circles. The radius of the circles corresponds to the radius of terror risk and the line width of the circles corresponds to the amplitude of terror risk. The first terrorist target 214 is Fisherman's Wharf. This might be a large car bomb creating a high amplitude risk with a relatively small risk radius since it would be directly targeted to the tourist location. The second target 216 might be the Federal Reserve Building in the financial district 206. This can be fairly well protected from large car bombs, but smaller personal bombs may be used. The amplitude is lower than Fisherman's Wharf, but the risk radius is larger since any one of the buildings in the financial district may be an alternative target. The third target 218 is the SFMTA building itself. This might be a lower amplitude risk, such as from a disgruntled employee with a weapon, and a small risk radius of just the inside of the building.

The F-car has a GPS system on board and data can be downloaded off of the SFMTA web site. Two days of data were downloaded at 10 second intervals. Each data point is presented on the graph as a small grey dot. Overlapping dots are shown as a darker color. The F-car route starts at the Castro Street Station, proceeds up Market Street past the SFMTA office and Federal Reserve Building and proceeds along the shore to Fisherman's Wharf. It then proceeds back. The cluster of dots at Fisherman's Wharf and Castro Street indicate that the F-cars spend a large amount of time at these stations. This provides a buffer to spread out F cars along the route. The cluster of dots near the Federal Reserve 204 indicate that the cars pass slowly through this area due to multiple tight turns. The clustering of dots within terror risk circles indicates to a user that an employee operating an F-car may be at particular risk in those areas. The clustering is in part visible due to small random errors in the GPS data. This spreads the dots out a bit.

The random errors in GPS data are problematic in the financial district where tall closely spaced building cause large errors 236 in position relative to terror risk radius associated with the Federal Reserve Building. If this data were used without correction, it might cause a significant error in the calculation of level of terror risk faced by an employee. As discussed below, these errors in position can at least in part be corrected for by constraining the position of the employee to be on the fixed route of the F-car.

Systematic errors in the GPS data are seen in the spurious routes 230 and 232. These are not random errors, but errors due to some other cause. The F-car may occasionally take an alternative route on different tracks 230. In that case, the route may be factored into the risk analysis. A spurious route 232, however, may not be on a track. In that case, the data may be disregarded or additional investigation may be made to determine why the GPS was giving readings where there was no track.

Figure 3:
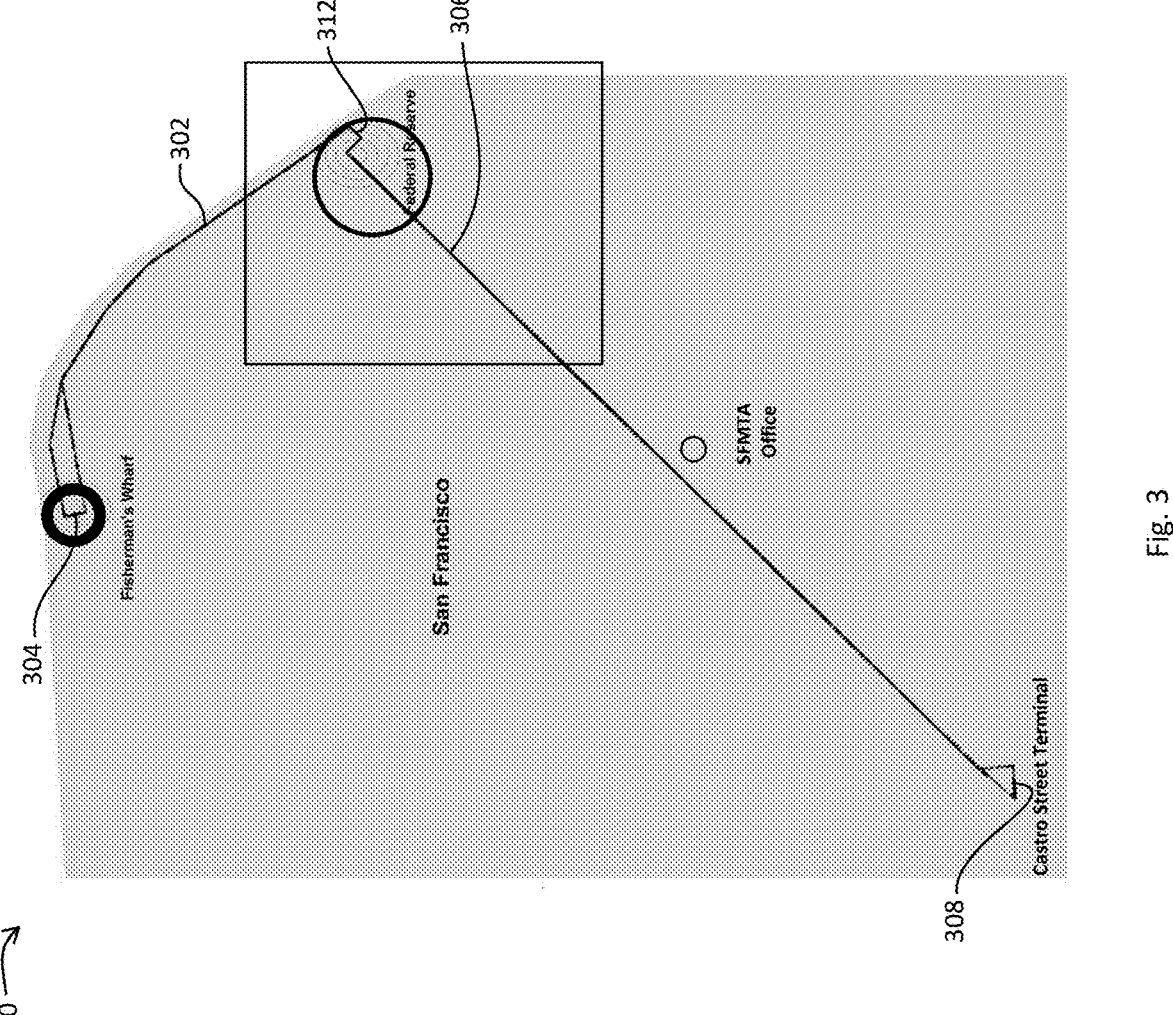
FIG. 3 is a graphical output illustrating monitored employee location distribution overlaid with a terror risk distribution where the monitored employee location distribution has been constrained to a fixed route.

The fixed route for the F-car was used to adjust the measured location data so that it was constrained to be on the F-car route. Each data point was adjusted to lie along the portion of track closest to the measurement. Mathematica® software running on a work station that was part of the computer-based system 100 was used to perform the transformation calculations. The results are shown in FIG. 3. This has a map 300 similar to FIG. 2 with the transformed data shown 302. The excessive scatter in the financial district 306 has been removed, but the clustering of data at Fisherman's Wharf 304, the Federal Reserve Building 312 and the Castro Street Terminal 308 is no longer readily visible. The excessive time spent by the F-car at these locations can be made visible, however, by displaying the data in bar graph format.

Graphical Presentation of Risk

Figure 4:
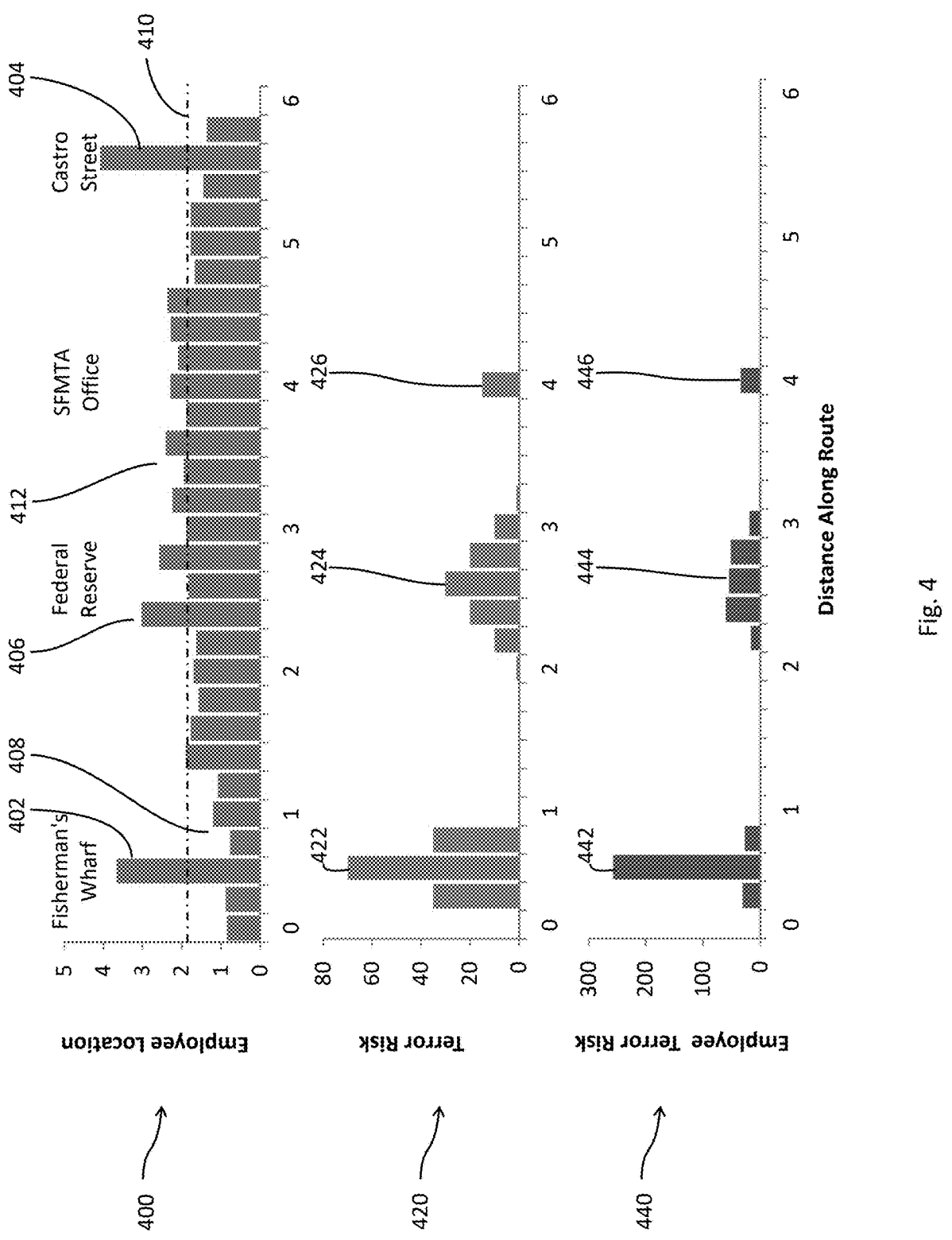
FIG. 4 is a series of bar graphs showing a measured employee location distribution, a prospective terror risk distribution and a distribution of employee terror risk over a fixed route.

FIG. 4 illustrates a graphical method to present the terror risk a mobile employee might face. The data is from the above referenced constrained F-car employee position measurements and the associated terror risk distribution calculated along the F-car route. Three bar graphs are presented showing the measured employee location distribution 400, calculated terror risk distribution 420, and calculated level of employee terror risk 440. The horizontal axis is the distance along the F-car route measured in miles.

The increased employee residence times at Fisherman's Wharf 402, Federal Reserve Building 406, and Castro Street 404 are seen in the employee location distribution graph. Generally higher residence times through the financial district 412 are also seen. The higher residency times in the financial district may be due the fact that the F-car shares the road with automobiles in this area. Low residency times in the areas adjacent to Fisherman's Wharf 408 may be due to the fact that the track is isolated from the automobile traffic in this area. The average residency time 410 is shown for the overall track.

Graph 420 shows the terror risk distribution calculated from the set of amplitudes and risk radii described above. The Fisherman's Wharf 422 and Federal Reserve 424 terror risk distributions are shown as linear distributions. The SMTA office terror risk distribution 426 is shown as a constant distribution.

Graph 440 shows the level of employee terror risk obtained from multiplying the employee location distribution data by the corresponding terror risk distribution data. The high level of risk 442 at Fisherman's Wharf is seen to be due to an overlap of the location where the F-cars wait 402 and the location of the terror target 422. If the waiting position could be shifted, then the exposure of the employee to terror risk could be significantly reduced. The employee location distribution is relatively high and uniform 412 around the Federal Reserve 25 target 424. This leads to a broad distribution of terror risk 444. This risk might be reduced if the track were modified in this area to isolate the F-car from the street traffic so that it could pass through the financial district more quickly. The relatively low but concentrated risk at the SFMTA office 446 can be addressed by reducing employee time at the office.

When the levels of risk are summed from the monitored employee location distribution, the overall level of employee terror risk has a value of 555. This is actually lower than the level of risk that would be calculated if it was assumed the employee was in the official work address at the SFMTA building full time. That level of risk has a value of 840. If monitored location data were not available, then a reasonably good estimate of the level of employee terror risk could be obtained by assuming that the employee location distribution was uniform along the route. That level is calculated to be 475.

Generalized Calculations

The equations and calculations described herein can be generalized. Employee locations and terror risk distributions, for example, may be characterized in three dimensions. If a terror risk was high up in a tall building, for example, but the employee was located in the lower areas of a building, then the overall employee terror risk would be low even though there was an x,y overlap in position of the employee and position of terror risk. The distribution of terror risk about a given target can also be generalized to take into account angular variations. For example, shock wave patterns can be calculated for given building configurations and explosion locations to determine unique risk patterns, such as the focusing of a risk at one position and the shielding of risk at another location.

<div align="center">CONCLUSION</div>

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. Therefore, it is intended that the disclosure not be limited to the particular embodiment disclosed as the best mode contemplated for carrying out this invention.

Wherein we claim:

1. A system for modifying waiting times a vehicle spends at different locations on a route, the system comprising:

a vehicle comprising a location measurement computer comprising a memory, a processor, and a plurality of computer code, the code stored in the memory, the code when executed by the processor causes the processor to:

iteratively receive, from a global positioning system (GPS), a plurality of monitored locations over a period of time, wherein the monitored locations are subject to errors when one or more of the GPS satellites are partially or completely blocked by buildings leading to GPS signal blockage resulting in errors in monitored position, each monitored location associated with a time, the plurality of monitored locations comprised within a pre-defined route, the plurality of monitored locations associated to the vehicle;

receive, from a database, a plurality of constraints associated to the vehicle, wherein the constraints comprise track locations for the vehicle on a track;

calculate a plurality of corrected locations to at least partially correct for the errors in monitored position, each corrected location of the plurality of corrected locations equal to a position, of a plurality of positions, on the pre-defined route, each position, of the plurality of positions, being closest to an associated monitored location, each corrected location based on at least one constraint of the plurality of constraints wherein if a monitored location is off of the track, the corrected location is set to the nearest track location;

wherein to calculate the corrected location, the code when further executed by the processor causes the processor to:

examine a set of track locations for each monitored location received from the GPS;

determine a distance between the monitored location and each track location in the set using a norm function; and select, as the corrected location, the track location that minimizes the distance to the monitored location; and further apply a velocity-bound constraint comparing a velocity implied by the corrected location to a velocity derived from at least one prior corrected location, and reject or adjust the corrected location when the implied velocity exceeds a predetermined bound;

calculate a plurality of durations, each duration associated with a quantity of time the vehicle spends at each corrected location of the plurality of corrected locations;

for each corrected location, of the plurality of corrected locations:

compute a level of risk of physical damage to the vehicle on the route by:

receiving risk data comprising a plurality of risk locations, each risk location having an associated risk amplitude and an associated risk radius;

for each risk location of the plurality of risk locations:

determining a risk distribution around the risk location based on the associated risk amplitude and risk radius;

calculating a risk value at the corrected location based on distance from each risk location; and summing the risk values from all risk locations to determine the level of risk of physical damage at the corrected location;

modify at least one waiting time of the vehicle on the route by shifting a waiting position of the vehicle to a location having a lower calculated risk of physical damage; and output the risk values and the modified at least one waiting time to an output device.

2. The system of claim 1 wherein the distribution is presented on the output device at least in part by an amplitude and a radius.

3. The system of claim 1 wherein the route is a three-dimensional route.

4. The system of claim 1 wherein the vehicle is one or more of:

a) an automobile; or b) the vehicle on a track.

5. The system of claim 1 wherein the output device is a computer screen and the output comprises one or more of:

a) a bar graph; or b) a map.

<div align="center">* * * * *</div>